Jan. 16, 1934.  F. G. HEUMANN  1,943,960
GRASS SHEARS
Filed Jan. 5, 1932
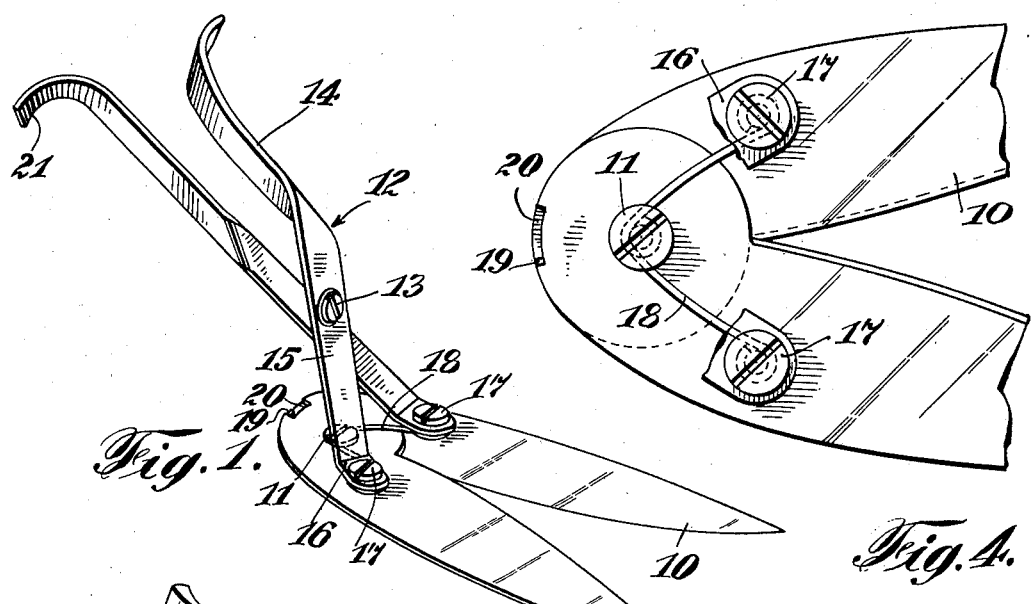
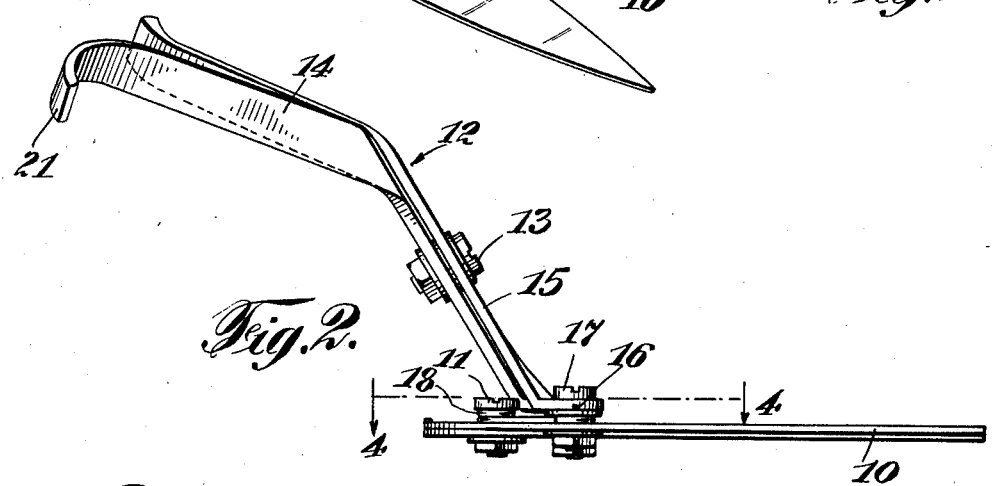
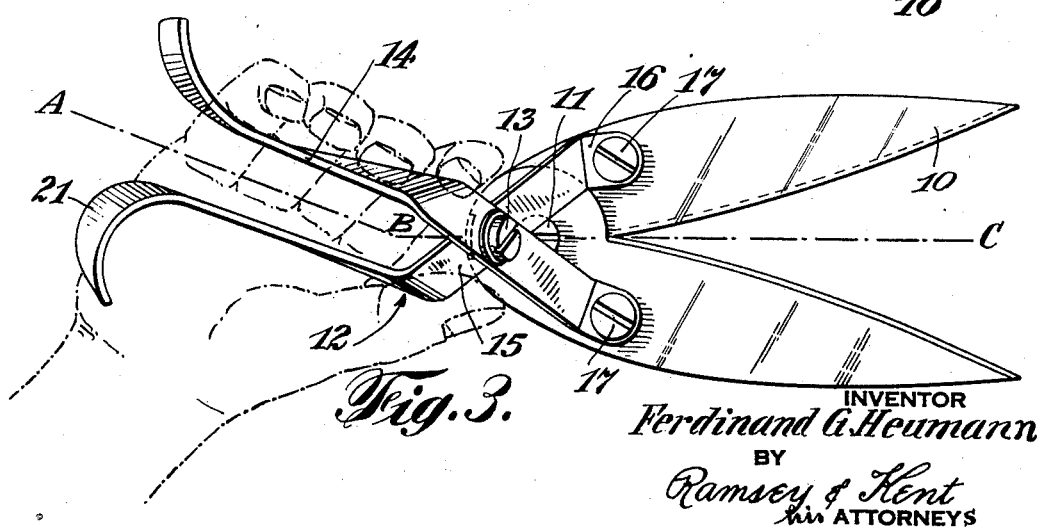
INVENTOR
Ferdinand G. Heumann
BY
Ramsey & Kent
his ATTORNEYS Patented Jan. 16, 1934

1,943,960

UNITED STATES PATENT OFFICE 1,943,960

GRASS SHEARS

Ferdinand G. Heumann, Great Neck, N. Y.

Application January 5, 1932. Serial No. 584,795

4 Claims. (Cl. 30—11)

This invention relates to hand shears and particularly to that type adapted for cutting grass and the like.

An object of the present invention is to provide a shearing device actuated by a pair of levers, formed in such a manner as to provide comfortable gripping means in spaced relation to the blades.

Another object is to provide handle levers operable by motion applied in a generally horizontal direction.

A further object is to provide an operating handle mounted asymmetrically with respect to the shear blades, the purpose of which will later be described in greater detail.

Further features and advantages of the present invention will be evident from the following detailed description and by reference to the accompanying drawing of which Figure 1 is a perspective view of applicant's device.

Figure 2 is an elevational view of the shears.

Figure 3 is a plan view showing the angular arrangement of the handle with respect to blades, with the hand of the operator shown in broken lines.

Figure 4 is an enlarged section taken along the line 4—4 of Figure 2, showing the spring and stop mechanism.

For simplicity, the levers employed in the device will be referred to by class numbers. A lever of the first class, is defined as that type whose points of applied force and delivered force are positioned respectively on opposite sides of the fulcrum. A lever of the third class is defined as one whose fulcrum and point of delivered force are positioned respectively on opposite sides of the point of applied force. Double levers, comprising a pair of similar levers joined at the fulcrum, are used throughout, in the present invention.

In the description and claims the shears will be assumed to be in operating position, that is with the blades lying in a horizontal plane.

Referring now to the drawing, a preferred embodiment of the present invention comprises a pair of blades 10 fulcrumed at one extremity by means of a blade pin 11, of any conventional design, represented in the drawing as a machine screw. A handle, composed of a pair of handle levers 12 is fulcrumed at point 13, intermediate their respective ends, to form, in effect, a double lever of the first class. The handle levers are bent above and below the fulcrum point to form three sections namely upper, intermediate, and lower.

The upper section 14, formed so as to be in generally horizontal position when in use, comprises the upper portions of the double lever 12. The two members of the upper section 14 are substantially parallel and are otherwise formed to provide a comfortable gripping portion. The intermediate section 15, fulcrumed at approximately its midsection, provides means to elevate the upper or gripping portion at a convenient distance above the blades 10. The lower section 16, comprises relatively short horizontal portions adapted to be pivotally mounted to the blades by pivot pins 17, as by machine screws, rivets or the like. The blades form, in effect, a double lever of the third class.

Spring means 18, herein represented as a coiled wire spring, connects the pivot pins 17, coils about the blade pin 11 and provides sufficient force to normally maintain the blades in open position. Stop mechanism, is provided to limit the motion of the shear blades, and comprises an upturned lug 19, struck up from one blade, adapted to travel in a slot 20, formed in the other blade. Motion is arrested at predetermined limits by the abutment of the lug with the extremity of the slot.

Although the two parts of the gripping portion are substantially parallel, they do not form a symmetrical structure with respect to the center line of the blades. As is shown in Figure 3, the center line of the handle gripping portion, represented by the line A—B is angularly positioned in relation to the center line B—C, of the shear blades.

The right hand of an operator is represented, by dot and dash lines, in the positions that a hand naturally occupies when held in front of the body. It will be seen that the asymmetrical arrangement of the handle, permits the shears to be grasped and used without undue twist or strain of the wrist from the natural position. Further advantage of the angular relationship is provided when it is desired to use the shears adjacent a vertical border. Grass shears serve their greatest usefulness when they are used to trim vegetation growing close to a wall and in other places inaccessible to the ordinary grass mower. By the angular arrangement of the handle in the present invention, it is possible for the operator to trim in close proximity to a vertical barrier without exposing his hand to abrasion, by contact with the rough surface.

At the extreme end of one of the gripping portions, is provided an outturned member 21, adapted to conform to the hand of the operator as indicated in Figure 3. This construction provides for more comfortable gripping of the implement. By engaging itself under the heel of the hand, this outturned member also provides means whereby the shears may be maintained in the hand of the operator without the application of pressure from the fingers. This feature permits the operator, when fatigued, to flex his fingers without temporarily disposing of the shears.

The handle portion has been herein shown as sloping slightly towards the blades. If desired they may be made parallel with the blades, or may slope in the opposite direction, that is with the ends directed downward. The angles employed, however, are preferably small, so that the handles may be said to be substantially parallel to the blades.

The handle levers are preferably made of flat metal strips, bent as shown to provide comfortable gripping means. This permits the use of cheap material, and inexpensive methods of fabrication to lower production costs.

Although only a preferred form of construction is herein disclosed it is to be understood that the invention is limited only by the scope of the appended claims.

I claim:

1. Shears comprising a pair of blades, handle levers pivotally connected to said blades, said handle levers being operable by relative horizontal motion, the gripping portion of said handle levers being bent to one side to form an angle with the center line of the blades.

2. Shears comprising a pair of blades, handle levers pivotally connected to said blades, said handle levers being operable by relative horizontal motion, the gripping portion of said handle levers being bent to one side to form an angle with the center line of the blades, said handles being substantially parallel with said blades in horizontal planes.

3. Shears comprising a pair of blades, handle levers pivotally connected to said blades, said handle levers being operable by relative horizontal motion, the gripping portion of said handle levers being bent to one side to form an angle with the center line of the blades, an outturned member at the extremity of one of the handle levers, shaped to conform with the heel of an operator's hand.

4. Shears comprising a pair of blades pivotally connected together at one end of each thereof; a pair of handle members pivotally connected, each to a blade forwardly of the blade fulcrum, said handle members extending angularly upwardly from said blades to cross each other; and means for pivotally securing said handle members together at their points of crossing, the handle members being bent above their fulcrum to lie substantially parallel to the blades and being bent toward each other to form one-handed gripping members.

FERDINAND G. HEUMANN.